(12) United States Patent
Marcus

(10) Patent No.: US 7,977,560 B2
(45) Date of Patent: Jul. 12, 2011

(54) AUTOMATED GENERATION OF A SONG FOR PROCESS LEARNING

(75) Inventor: Jane B. Marcus, Westford, MA (US)

(73) Assignee: International Business Machines Corporation, Armonk, NY (US)

(*) Notice: Subject to any disclaimer, the term of this patent is extended or adjusted under 35 U.S.C. 154(b) by 211 days.

(21) Appl. No.: 12/345,193

(22) Filed: Dec. 29, 2008

(65) Prior Publication Data
US 2010/0162879 A1    Jul. 1, 2010

(51) Int. Cl.
*G10H 1/00* (2006.01)

(52) U.S. Cl. .............. 84/609; 84/615; 84/649; 84/653

(58) Field of Classification Search ........... 84/600–602, 84/609–613, 615, 653, 649–651
See application file for complete search history.

(56) References Cited

U.S. PATENT DOCUMENTS

| | | | | |
|---|---|---|---|---|
| 3,632,887 A * | 1/1972 | Leipp et al. | ............ | 704/260 |
| 3,704,345 A * | 11/1972 | Coker et al. | ............ | 704/266 |
| 4,731,847 A * | 3/1988 | Lybrook et al. | ............ | 704/260 |
| 4,926,737 A * | 5/1990 | Minamitaka | ............ | 84/611 |
| 5,088,380 A * | 2/1992 | Minamitaka | ............ | 84/637 |
| 5,235,124 A * | 8/1993 | Okamura et al. | ............ | 434/307 A |
| 5,471,009 A * | 11/1995 | Oba et al. | ............ | 84/645 |
| 5,703,311 A * | 12/1997 | Ohta | ............ | 84/622 |
| 5,747,715 A * | 5/1998 | Ohta et al. | ............ | 84/609 |
| 5,857,171 A * | 1/1999 | Kageyama et al. | ............ | 704/268 |
| 5,895,449 A * | 4/1999 | Nakajima et al. | ............ | 704/278 |
| 6,304,846 B1 * | 10/2001 | George et al. | ............ | 704/270 |
| 6,424,944 B1 * | 7/2002 | Hikawa | ............ | 704/260 |
| 6,462,264 B1 * | 10/2002 | Elam | ............ | 84/645 |
| 6,689,946 B2 * | 2/2004 | Funaki | ............ | 84/478 |
| 6,746,246 B2 * | 6/2004 | Cliff | ............ | 434/219 |
| 6,992,245 B2 * | 1/2006 | Kenmochi et al. | ............ | 84/622 |
| 7,241,947 B2 * | 7/2007 | Kobayashi | ............ | 84/645 |
| 7,365,260 B2 * | 4/2008 | Kawashima | ............ | 84/600 |
| RE40,543 E * | 10/2008 | Aoki et al. | ............ | 84/609 |
| 7,495,164 B2 * | 2/2009 | Funaki | ............ | 84/609 |
| 7,563,975 B2 * | 7/2009 | Leahy et al. | ............ | 84/619 |
| 7,613,612 B2 * | 11/2009 | Kemmochi et al. | ............ | 704/264 |
| 7,790,974 B2 * | 9/2010 | Sherwani et al. | ............ | 84/609 |
| 2001/0037720 A1 * | 11/2001 | Funaki | ............ | 84/478 |
| 2002/0000156 A1 * | 1/2002 | Nishimoto et al. | ............ | 84/609 |
| 2002/0012900 A1 * | 1/2002 | Song | ............ | 434/307 A |
| 2003/0009336 A1 * | 1/2003 | Kenmochi et al. | ............ | 704/258 |
| 2003/0159568 A1 * | 8/2003 | Kemmochi et al. | ............ | 84/626 |
| 2003/0221542 A1 * | 12/2003 | Kenmochi et al. | ............ | 84/616 |

(Continued)

*Primary Examiner* — David S. Warren
(74) *Attorney, Agent, or Firm* — Steven M. Greenberg, Esq.; Carey, Rodriguez, Greenberg & Paul

(57) ABSTRACT

Embodiments of the present invention address deficiencies of the art in respect to ad hoc music creation to facilitate learning and provide a method, system and computer program product for the automated generation of a song for process learning. In an embodiment of the invention, a method for automated generation of a song for process learning can include loading from fixed storage a process description for transformation into a song intended to facilitate learning of the process by a target listener. The method also can include defining lyrical segments for the process description, selecting a particular melody from a set of melodies stored in fixed storage, and mapping the defined lyrical segments to musical phrases in the particular melody. Finally, the method can include merging pre-recorded audio segments corresponding to the defined lyrical segments with the musical phrases in the particular melody according to the mapping to generate the song.

9 Claims, 1 Drawing Sheet

U.S. PATENT DOCUMENTS

| | | | |
|---|---|---|---|
| 2004/0006472 A1* | 1/2004 | Kemmochi | 704/269 |
| 2004/0123724 A1* | 7/2004 | Funaki | 84/478 |
| 2004/0243413 A1* | 12/2004 | Kobayashi | 704/258 |
| 2004/0244565 A1* | 12/2004 | Cheng et al. | 84/610 |
| 2006/0230910 A1* | 10/2006 | Song et al. | 84/616 |
| 2007/0261535 A1* | 11/2007 | Sherwani et al. | 84/609 |
| 2009/0217805 A1* | 9/2009 | Lee et al. | 84/611 |
| 2010/0162879 A1* | 7/2010 | Marcus | 84/609 |

* cited by examiner

AUTOMATED GENERATION OF A SONG FOR PROCESS LEARNING

BACKGROUND OF THE INVENTION

1. Field of the Invention

The present invention relates to the field of e-learning and more particularly to song facilitated memorization of a process.

2. Description of the Related Art

Song facilitated memorization long has been a foundation of learning for both old and young, alike. Montessori schools have used songs—lyrics coordinated with melodies—to impart process knowledge to young children. In this regard, educators recognize the power of the human mind to commit to memory information when imparted through the repetitive playback of a song. Indeed, musicians have used the power of music to deliver philosophical, religious, sociological and political messages since biblical times. In its most basic form, the melody of a song permits the mental recall of the lyrics coordinated with the melody to form the song.

Creating a song for the purpose of committing to memory the lyrics of the song can be complicated as not all melodies coordinate easily with desired lyrics when the desired lyrics are to reflect specific information for committal to memory. Consequently, professional musicians and lyricists have been left with the task of creating a relevant song to act as an educational tool. Accordingly, creating a song designed to impart the knowledge of a process requires the contracting of a musician at great expense. Further, the more complicated the process to be reflected within a song, the more difficult it can be to coordinate an appropriate melody with lyrics. To the extent that the process includes multi-syllabic terms, even so much more complicated will be the coordination of the lyrics with the melody. Furthermore it is important that the target listener finds the song for learning purposes to be engaging, which is difficult to accomplish in an automated process, given that people may have varying backgrounds and varying musical tastes.

Many computing end users surely would benefit from the ability to generate relevant songs to facilitate process memorization. Examples abound and include parents seeking to teach children a critical process such as the required dosing of medicine at the prescribed interval, teachers seeking to teach children to cross a street, caretakers teaching a mentally impaired person to use kitchen appliances, and even professional information technologists seeking to teach end users to perform computing tasks like troubleshooting an inoperable copier or printer, to name only a few of infinitely possible scenarios.

Yet, most computing end users lack the resources or knowledge to compose a melody compatible with lyrics having content consistent with the information to be committed to memory about a process. Of course, most computing end users would choose not to undertake the great expense of contracting a professional musician to create a song. Thus, the use of music to facilitate learning eludes a substantial segment of end users likely to benefit from the ad hoc creation of a personalized song to facilitate learning.

BRIEF SUMMARY OF THE INVENTION

Embodiments of the present invention address deficiencies of the art in respect to ad hoc music creation to facilitate learning and provide a novel and non-obvious method, system and computer program product for the automated generation of a song for process learning. In an embodiment of the invention, a method for automated generation of a song for process learning can include loading from fixed storage a process description for transformation into a song intended to facilitate learning of the process by a target listener. The method also can include defining lyrical segments for the process description, selecting a particular melody from a set of melodies stored in fixed storage, and mapping the defined lyrical segments to musical phrases in the particular melody. Finally, the method can include merging pre-recorded audio segments corresponding to the defined lyrical segments with the musical phrases in the particular melody according to the mapping to generate the song.

In one aspect of the embodiment, selecting a particular melody from a set of melodies stored in fixed storage can include specifying a characterization of the target listener, defining a subset of the melodies consonant with the characterization, and selecting a particular one of the melodies in the subset of the melodies. In this regard, the characterization can include a characterization of the target listener such as an age group, gender, music style preference, ethnicity and language. In another aspect of the embodiment, selecting a particular melody from a set of melodies stored in fixed storage can include determining a syllabic profile for at least one of the lyrical segments and selecting a particular melody from a set of melodies matching the syllabic profile. For example, the syllabic profile can include a number of syllables in at least one of the lyrical segments, or a number of letters in a particular word in at least one of the lyrical segments.

In another embodiment of the invention, a music editor data processing system can be configured for automated generation of a song for process learning. The system can include a host computing platform with an operating system and a music editor executing in the host computing platform through the operating system. The system also can include a personalized song generation module coupled to the music editor. The module can include program code enabled to load from fixed storage coupled to the host computing platform a process description for transformation into a song intended to facilitate learning of the process by a target listener, to define lyrical segments for the process description, to select a particular melody from amongst a set of melodies stored in the fixed storage, to map the defined lyrical segments to musical phrases in the particular melody, and to merge pre-recorded audio segments corresponding to the defined lyrical segments with the musical phrases in the particular melody according to the mapping to generate the song.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for automated generation of a song for process learning. In accordance with an embodiment of the present invention, portions of text of a process can be stored as lyrical segments in memory. A characterization of a target listener can be specified and mapped to a subset of stored melodies consonant with the characterization. Thereafter, a particular one of the melodies in the subset can be selected according to syllabic compatibility of the particular one of the melodies and the portions of text. Finally, the particular one of the melodies can be digitally merged with pre-recorded audio equivalents of the portions of text to generate a song for process learning of the process.

Figure 1:
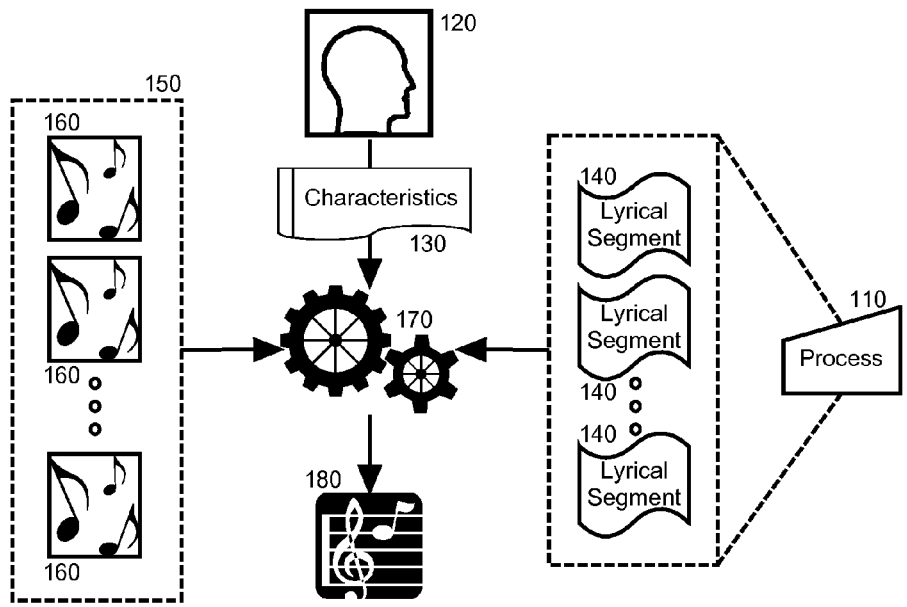
FIG. 1 is a pictorial illustration of a process for automated generation of a song for process learning.

In further illustration, FIG. 1 pictorially shows a process for the automated generation of a song for process learning. As shown in FIG. 1, portions of text of a process 110 can be defined as lyrical segments 140 representative of the process 110. Further, characteristics 130 of a target listener 120, for example an age group, gender, music style preference, ethnicity or language preference, can be specified. Thereafter, a subset 150 of melodies 160, each consistent with the characteristics 130, can be determined and a personalized song generation procedure 170 can select a particular one of the melodies 160 from amongst the subset 150 according to the syllabic profile of the lyrical segments 140. Finally, the song generation procedure 170 can merge pre-recorded audio corresponding to the lyrical segments 140 with the particular one of the melodies 160 to digitally generate a song 180. In this way, the playback of the digitally generated song 180 can provide a learning tool for the target listener 120 to learn the process 110.

Figure 2:
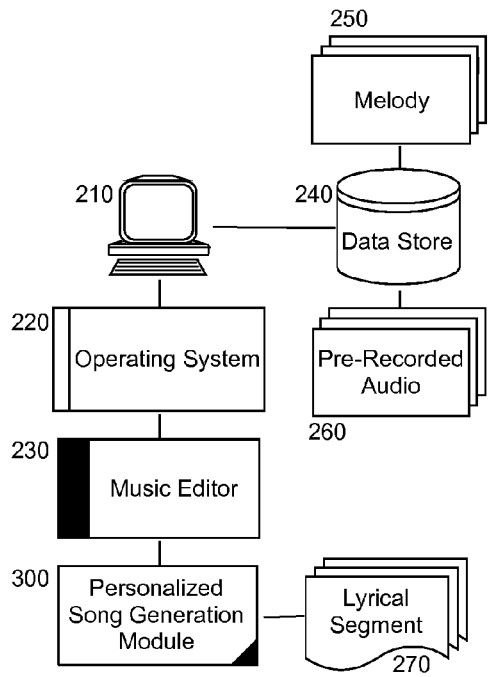
FIG. 2 is a schematic illustration of a music editor data processing system configured for automated generation of a song for process learning; and, FIG. 3 is a flow chart illustrating a process for automated generation of a song for process learning.

The process described in connection with FIG. 1 can be implemented within a music editor data processing system. In illustration, FIG. 2 schematically depicts a music editor data processing system configured for automated generation of a song for process learning. The system can include a host computing platform 210 with a processor, memory and fixed storage 240 supporting the execution of an operating system 220. The operating system 220 in turn can host the operation of a music editor application 230 configured to edit digitally stored music and to generate songs from melodies 250 and pre-recorded audio 260 stored in fixed storage 240.

A personalized song generation module 300 can be coupled to the music editor 230 and can execute in the host computing platform by way of the operating system 220. The personalized song generation module 300 can include program code enabled to define different lyrical segments 270 from textual portions of a process to be learned by a target listener. The program code further can be enabled to determine a subset of the melodies 250 consistent with a characterization of the target listener, and to select a particular one of the melodies 250 in the subset according to syllabic compatibility with the lyrical segments 270. The program code even yet further can be enabled to retrieve pre-recorded audio 260 for the lyrical segments 270 and to merge the pre-recorded audio 260 with the particular one of the melodies 250 in order to generate a song utilizing the pre-recorded audio 260 in concert with the particular one of the melodies 250 selected according to the syllabic compatibility with the lyrical segments 270. In consequence, the generated song can be used as an audio tool for teaching the process to the target listener.

Figure 3:
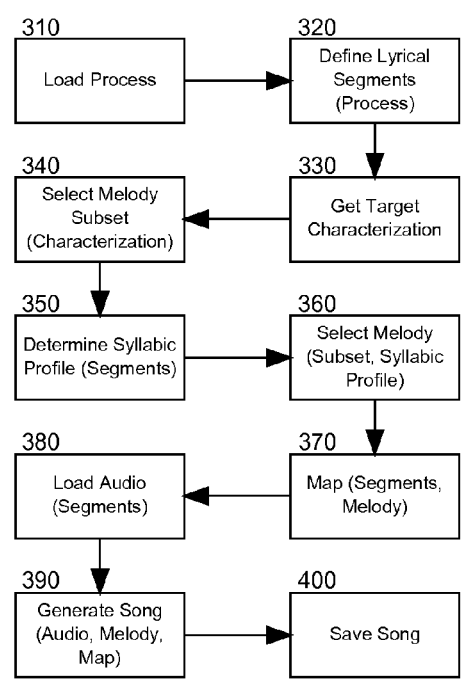

In even yet further illustration of the operation of the personalized song generation module 300, FIG. 3 is a flow chart illustrating a process for automated generation of a song for process learning. Beginning in block 310, a process description can be loaded for transformation into a song intended to facilitate learning of the process by a target listener. In block 320, lyrical segments can be defined for the process—essentially, textual phrases describing process steps of the process. In block 330, a characterization of the target listener can be specified, for instance an age group, gender, ethnicity or native language. Thereafter, in block 340, a subset of pre-stored digitally recorded melodies can be selected that conform to the characterization, for example, only Spanish language melodies are selected into the subset for a Hispanic target listener, or only nursery rhyme melodies are selected into the subset for a child target listener. Furthermore, the melody selection can be refined according to the music style preferences of the target listener, for example the target listener prefers rock and roll melodies, and does not prefer folk melodies.

In block 350, the syllabic profile of the lyrical segments can be determined. Specifically, a syllable count can be determined for the text of one or more of the lyrical segments. Alternatively, a letter count can be determined for a word in one or more of the lyrical segments deemed important for learning the process. Subsequently, in block 360, a particular melody in the subset of melodies can be selected that matches the syllabic profile so as to ensure an audibly consistent mapping of the lyrical segments to the musical composition of the particular melody.

In block 370, the lyrical segments can be individual mapped to musical phrases in the particular melody. In block 380, pre-recorded digital audio for each of the lyrical segments can be loaded and in block 390, a song can be generated by merging the pre-recorded digital audio with the mapped musical phrases of the particular melody. Finally, in block 400, the song can be saved to fixed storage with a title indicative of the purpose of the song for playback in facilitating the learning of the process.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for automated generation of a song for process learning, the method comprising:
    loading from fixed storage a process description for transformation into a song intended to facilitate learning of the process by a target listener;
    defining lyrical segments for the process description;
    specifying a characterization of the target listener;
    defining a subset of melodies consonant with the characterization;
    determining a syllabic profile for at least one of the lyrical segments;
    selecting a particular melody from the defined subset of melodies stored in the fixed storage matching the syllabic profile;
    mapping the defined lyrical segments to musical phrases in the particular melody; and,
    merging pre-recorded audio segments corresponding to the defined lyrical segments with the musical phrases in the particular melody according to the mapping to generate the song.

2. The method of claim 1, wherein the characterization comprises a characterization of the target listener selected from the group consisting of age group, gender, music style preference, ethnicity and language.

3. The method of claim 1, wherein the syllabic profile is a number of syllables in at least one of the lyrical segments.

4. The method of claim 1, wherein the syllabic profile is a number of letters in a particular word in at least one of the lyrical segments.

5. A music editor data processing system configured for automated generation of a song for process learning, the system comprising:
    a host computing platform with an operating system;
    a music editor executing in the host computing platform through the operating system; and,
    a personalized song generation module coupled to the music editor, the module comprising program code enabled to load from fixed storage coupled to the host computing platform a process description for transformation into a song intended to facilitate learning of the process by a target listener, to define lyrical segments for the process description, to specify a characterization of the target listener, to define a subset of the melodies consonant with the characterization, to determine a syllabic profile for at least one of the lyrical segments, to select a particular melody from the defined subset of melodies stored in the fixed storage matching the syllabic profile, to map the defined lyrical segments to musical phrases in the particular melody, and to merge pre-recorded audio segments corresponding to the defined lyrical segments with the musical phrases in the particular melody according to the mapping to generate the song.

6. A computer program product comprising a computer usable medium embodying computer usable program code for automated generation of a song for process learning, the computer program product comprising:
    computer usable program code for loading from fixed storage a process description for transformation into a song intended to facilitate learning of the process by a target listener;
    computer usable program code for defining lyrical segments for the process description;
    computer usable program code for specifying a characterization of the target listener;
    computer usable program code for defining a subset of melodies consonant with the characterization;
    computer usable program code for determining a syllabic profile for at least one of the lyrical segments;
    computer usable program code for selecting a particular melody from the defined subset of melodies stored in the fixed storage matching the syllabic profile;
    computer usable program code for mapping the defined lyrical segments to musical phrases in the particular melody; and,
    computer usable program code for merging pre-recorded audio segments corresponding to the defined lyrical segments with the musical phrases in the particular melody according to the mapping to generate the song.

7. The computer program product of claim 6, wherein the characterization comprises a characterization of the target listener selected from the group consisting of age group, gender, music style preference, ethnicity and language.

8. The computer program product of claim 6, wherein the syllabic profile is a number of syllables in at least one of the lyrical segments.

9. The computer program product of claim 6, wherein the syllabic profile is a number of letters in a particular word in at least one of the lyrical segments.

* * * * *